US011327232B2

(12) United States Patent
Hasegawa

(10) Patent No.: US 11,327,232 B2
(45) Date of Patent: May 10, 2022

(54) LIGHT POLARIZING ELEMENT AND METHOD OF FORMING THE SAME

(71) Applicant: FURUKAWA ELECTRIC CO., LTD., Tokyo (JP)

(72) Inventor: Junichi Hasegawa, Tokyo (JP)

(73) Assignee: FURUKAWA ELECTRIC CO., LTD., Tokyo (JP)

(*) Notice: Subject to any disclaimer, the term of this patent is extended or adjusted under 35 U.S.C. 154(b) by 0 days.

(21) Appl. No.: 16/865,616

(22) Filed: May 4, 2020

(65) Prior Publication Data

US 2020/0264374 A1 Aug. 20, 2020

Related U.S. Application Data

(63) Continuation of application No. PCT/JP2018/046390, filed on Dec. 17, 2018.

(30) Foreign Application Priority Data

Dec. 15, 2017 (JP) .............................. JP2017-240322

(51) Int. Cl.
*G02B 6/26* (2006.01)
*G02F 1/225* (2006.01)
*G02B 6/27* (2006.01)

(52) U.S. Cl.
CPC ......... *G02B 6/2726* (2013.01); *G02F 1/2255* (2013.01)

(58) Field of Classification Search
CPC .................. G02B 6/2726; G02F 1/2255
See application file for complete search history.

(56) References Cited

U.S. PATENT DOCUMENTS 7,035,494 B1 * 4/2006 Mackie ............... G02B 6/2813
385/129
9,116,298 B2 8/2015 Kojima et al.
9,557,485 B2 1/2017 Kojima et al.
(Continued)

FOREIGN PATENT DOCUMENTS

CN 106094199 A 11/2016
CN 107450126 A 12/2017
(Continued)

OTHER PUBLICATIONS

International Search Report dated Mar. 5, 2019 in PCT/JP2018/046390 filed Dec. 17, 2018, 2 pages.
(Continued)

*Primary Examiner* — Eric Wong
(74) *Attorney, Agent, or Firm* — Oblon, McClelland, Maier & Neustadt, L.L.P.

(57) ABSTRACT

A light polarizing element include: a first port waveguide; two second port waveguides; and a multi-mode interference waveguide optically connected to the first port waveguide and the two second port waveguides, the multi-mode interference waveguide having at least one slit formed therein, the at least one slit having a shape that enables the multi-mode interference wave guide to give different effective refractive indexes to respective mutually orthogonal polarized light waves input from the first port waveguide, thereby separating the mutually orthogonal polarized light waves, and that enables the separated mutually orthogonal polarized light waves to be output from the respective two second port waveguides.

10 Claims, 6 Drawing Sheets

(56) References Cited

U.S. PATENT DOCUMENTS

| | | | |
|---|---|---|---|
| 10,310,159 B2 | 6/2019 | Nagashima et al. | |
| 10,444,430 B2 | 10/2019 | Uchida et al. | |
| 2006/0165340 A1* | 7/2006 | Wu | G02B 6/138 385/5 |
| 2007/0110363 A1* | 5/2007 | Miyadera | G02B 6/2813 385/27 |
| 2007/0147722 A1* | 6/2007 | Kondo | G02F 1/2255 385/2 |
| 2009/0214161 A1* | 8/2009 | Tsuda | G02F 1/3132 385/22 |
| 2010/0172610 A1* | 7/2010 | Gates | G02B 6/12007 385/14 |
| 2014/0212137 A1* | 7/2014 | Watanabe | H04J 14/06 398/65 |
| 2016/0246001 A1* | 8/2016 | Uchida | G02B 6/136 |
| 2017/0176680 A1* | 6/2017 | Oka | G02B 6/126 |
| 2019/0094463 A1 | 3/2019 | Hasegawa | |

FOREIGN PATENT DOCUMENTS

| | | | |
|---|---|---|---|
| JP | 2014-182371 A | 9/2014 | |
| JP | 2016-180978 A | 10/2016 | |
| JP | 2017-181963 A | 10/2017 | |
| JP | 6219887 B2 | 10/2017 | |
| JP | 2017-203879 A | 11/2017 | |
| JP | 2020024256 A | * | 2/2020 |

OTHER PUBLICATIONS

Mackie, D. M. et al., "Slotted multimode-interference devices," Applied Optics, vol. 43, No. 36, Dec. 20, 2004, pp. 6609-6619.

* cited by examiner

LIGHT POLARIZING ELEMENT AND METHOD OF FORMING THE SAME

CROSS-REFERENCE TO RELATED APPLICATION(S)

This application is a continuation of International Application No. PCT/JP2018/046390, filed on Dec. 17, 2018 which claims the benefit of priority of the prior Japanese Patent Application No. 2017-240322, filed on Dec. 15, 2017, the entire contents of which are incorporated herein by reference.

BACKGROUND

The present disclosure relates to a light polarizing element and a method of manufacturing the same.

A light polarizing element capable of combining polarized light waves and separating polarized light waves is used for a recent high-performance optical communication method to which a technique such as polarization diversity or a coherent mixer is applied. In the related art, a light polarizing element of an optical waveguide type that employs the configuration of a Mach-Zehnder (MZI) interferometer has been known as such a light polarizing element. In some cases, a light polarizing element of this type employs a configuration in which a quarter wavelength plate is inserted in a slit formed in such a manner as to traverse an arm waveguide (Japanese Patent No. 6219887).

In that case, light that propagates through an arm waveguide in the light polarizing element is not optically confined by the waveguide while passing through the slit, which results in a radiation loss of the light. This radiation loss becomes larger as the width of the slit becomes wider, and becomes larger as the relative refractive-index difference of the waveguide becomes larger. Such a radiation loss increases the excess loss of the polarization element and is preferably reduced as much as possible. As a method for reducing a radiation loss, a method is known in which the shape of an arm waveguide traversed by a slit is set to a shape that widens toward the slit in a tapered shape (Japanese Laid-open Patent Publication No. 2017-181963).

SUMMARY

There is a need for providing a light polarizing element and a method of manufacturing the same that can suppress a radiation loss, reduce the, and can be formed with ease.

According to an embodiment, a light polarizing element include: a first port waveguide; two second port waveguides; and a multi-mode interference waveguide optically connected to the first port waveguide and the two second port waveguides, the multi-mode interference waveguide having at least one slit formed therein, the at least one slit having a shape that enables the multi-mode interference wave guide to give different effective refractive indexes to respective mutually orthogonal polarized light waves input from the first port waveguide, thereby separating the mutually orthogonal polarized light waves, and that enables the separated mutually orthogonal polarized light waves to be output from the respective two second port waveguides.

According to an embodiment, a light polarizing element includes: a first port waveguide; two second port waveguides; and a rectangular multi-mode interference waveguide optically connected to the first port waveguide and the two second port waveguides. Further, the multi-mode interference waveguide has at least one slit formed therein, the at least one slit extending in a direction substantially parallel to a direction extending from the first port waveguide toward the two second port waveguides.

According to an embodiment, a method of forming a light polarizing element, includes: forming shapes of a waveguide that includes a first port waveguide, two second port waveguides, and a multi-mode interference waveguide optically connected to the first port waveguide and the two second port waveguides; and forming at least one slit in the multi-mode interference waveguide, the at least one slit having a shape that enables the multi-mode interference wave guide to give different effective refractive indexes to respective mutually orthogonal polarized light waves input from the first port waveguide, thereby separating the mutually orthogonal polarized light waves, and that enables the separated mutually orthogonal polarized light waves to be output from the respective two second port waveguides.

DETAILED DESCRIPTION

In recent years, optical waveguides made of a silica-based glass and employing a planar lightwave circuit (PLC) technique have been proposed that are designed to have a larger relative refractive-index difference than in designs in the related art. Given this situation, further reduction of such radiation losses is demanded. In addition, work of mounting a quarter wavelength plate by inserting the quarter wavelength plate into a slit is needed for a light polarizing element in the related art. Carrying out this work requires to provide a space of a certain size around a location at which the quarter wavelength plate is inserted. For this reason, for example, two arm waveguides need to be spaced sufficiently apart from each other, or the slit needs to have at least a certain length. Thus, the element may possibly have an unnecessarily large size.

The following describes embodiments with reference to the accompanying drawings. These embodiments are not intended to limit the present disclosure. The drawings illustrate identical or corresponding components with the same reference sign given thereto as appropriate. It needs to be noted that, because each of the drawings is schematic, the relations between dimensions of and the relative sizes of components therein are not necessarily to scale. The relations between dimensions and the relative sizes of some parts may be different between the drawings.

Figure 9:
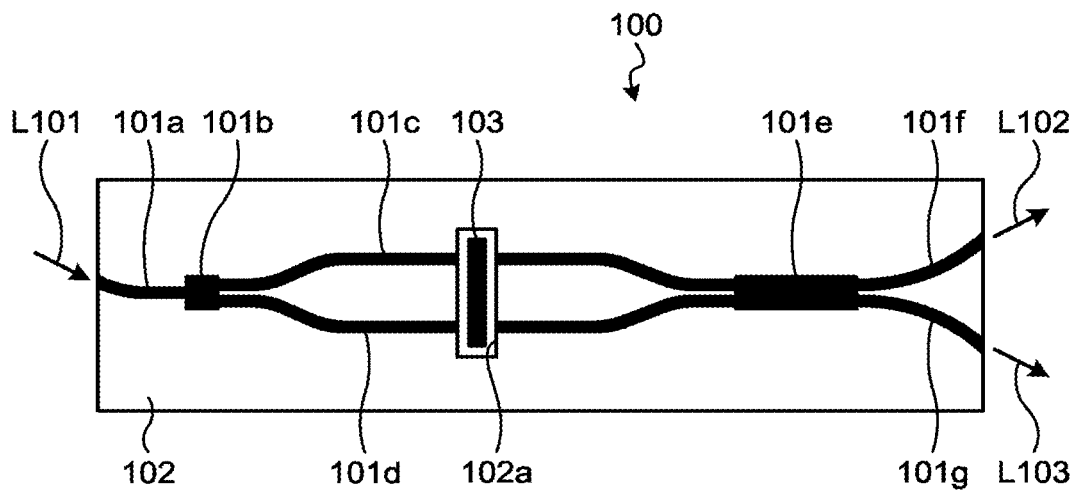
FIG. 9 is a schematic view of an example of a light polarizing element in related art.

First, an example of a light polarizing element in the related art is described with reference to FIG. 9. A light polarizing element 100 illustrated in FIG. 9 has an Mach-Zehnder (MZI) type configuration using a silica-based glass, and includes an input port waveguide 101a, a 1×2 optical coupler waveguide 101b, two arm waveguides 101c and 101d, a 2×2 optical coupler waveguide 101e, two output port waveguides 101f and 101g, a clad 102 surrounding the outer circumferences of these waveguides, and a quarter wavelength plate 103.

The input port waveguide 101a is connected to the one-port side of the optical coupler waveguide 101b. The optical coupler waveguide 101b is a multi-mode optical interference waveguide. Each of the two arm waveguides 101c and 101d has one end thereof connected to the two-port side of the optical coupler waveguide 101b and has the other end thereof connected to one of the two port sides of the optical coupler waveguide 101e. The optical coupler waveguide 101e is also a multi-mode optical interference waveguide. Each of the two output port waveguides 101f and 101g is connected to the other two-port side of the optical coupler waveguide 101e.

The clad 102 has a slit 102a therein that is formed in such a manner as to traverse the two arm waveguides 101c and 101d, and the slit 102a has the quarter wavelength plate 103 inserted therein. The quarter wavelength plate 103 is fixed using, for example, an adhesive agent. Each of the arm waveguides 101c and 101d is shaped in a tapered shape that widens toward the slit 102a although FIG. 7 does not illustrate the shape.

The light polarizing element 100 functions as a polarized-wave separating element that, when light L101 polarized in a desired wave is input to the input port waveguide 101a, separates the light into light L102 and L103 that are two linearly polarized components of light (light in the transverse magnetic (TM) mode and light in the transverse electric (TE) mode) orthogonal to each other and outputs these components from the output port waveguides 101f and 101g. The light polarizing element 100 also functions as a polarized-wave combining element because of the reciprocity of light.

Figure 10:
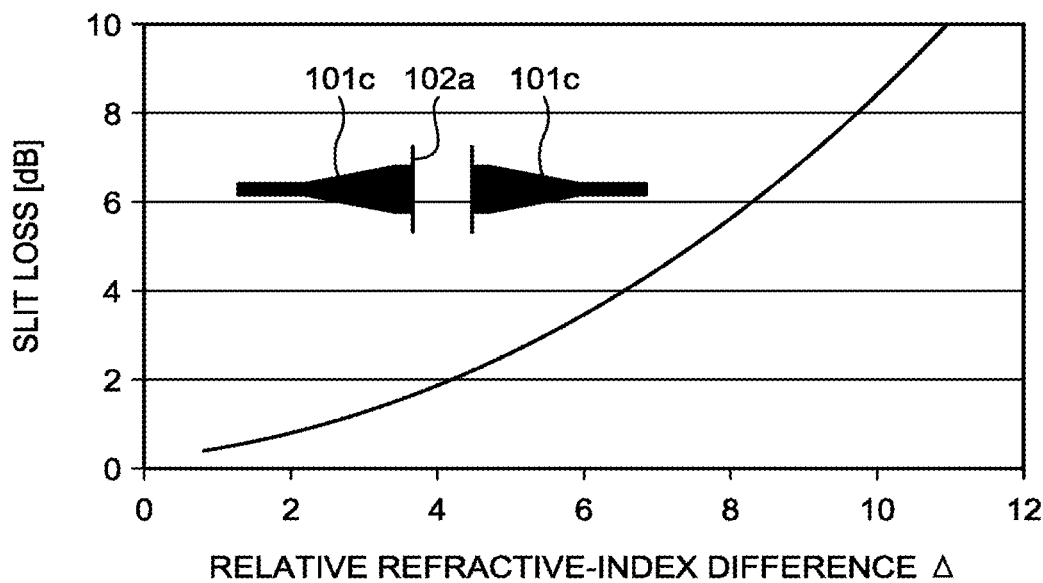
FIG. 10 illustrates an example of an optical characteristic of the light polarizing element illustrated in FIG. 9.

FIG. 10 illustrates an example of an optical characteristic of the light polarizing element 100. Specifically, FIG. 10 illustrates an example of the relation between the relative refractive-index difference Δ of each of the waveguides (the input port waveguide 101a, the optical coupler waveguide 101b, the arm waveguides 101c and 101d, the optical coupler waveguide 101e, and the output port waveguides 101f and 101g) with respect to the clad 102 and a slit loss. Herein, the slit loss means a loss, including a radiation loss due to the slit 102a, generated because of the presence of the slit 102a. The width (corresponding to the distance between the end faces facing each other of the arm waveguides 101c and 101d) of the slit 102a is set constant.

As illustrated in FIG. 10, the increase of the slit loss becomes shaper as the relative refractive-index difference Δ become larger. The increase of the slit loss is mainly attributed to increase of the radiation loss.

As can be found from FIG. 10, it is important to reduce a radiation loss to a larger extent in the case of a design in which a relative refractive-index difference is larger. In addition, as described above, work of mounting the quarter wavelength plate 103 by inserting the quarter wavelength plate 103 into the slit 102a is needed for the light polarizing element 100. Thus, the light polarizing element 100 may possibly have an unnecessarily large size.

The inventors of the present disclosure have intensely conducted studies to solve the above-described inconvenience and obtained a novel finding that a polarized-wave separating function or a polarized-wave combining function can be obtained by having a slit(s) formed in a multi-mode interference waveguide.

First Embodiment

Figure 1A:
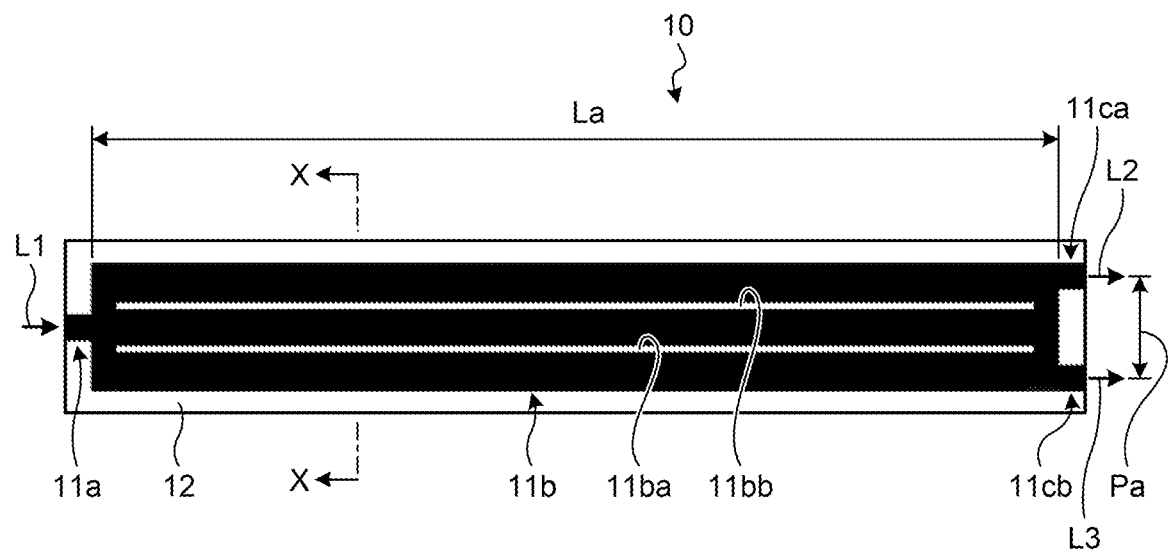
FIG. 1A is a schematic view of a light polarizing element according to a first embodiment.
Figure 1B:
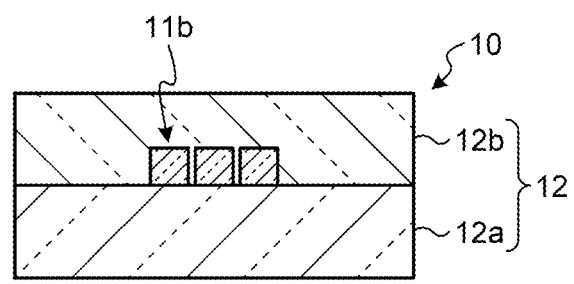
FIG. 1B is a schematic view of a light polarizing element according to the first embodiment.

FIGS. 1A and 1B are schematic views of a light polarizing element according to a first embodiment. FIG. 1A is a top view, and FIG. 1B is a sectional view taken along the X-X line of FIG. 1A.

A light polarizing element 10 includes a first port waveguide 11a, a multi-mode interference waveguide 11b, two second port waveguides 11ca and 11cb, and a clad 12.

The multi-mode interference waveguide 11b has a substantially rectangular section when taken in a direction perpendicular to the lengthwise direction thereof (propagation direction of light) and is a substantially rectangular waveguide in a top view. While the first port waveguide 11a is optically connected to one of the opposite short sides of a rectangle, the second port waveguides 11ca and 11cb are optically connected to the other one thereof.

The clad 12 surrounds the first port waveguide 11a, the multi-mode interference waveguide 11b, and the second port waveguides 11ca and 11cb and includes a lower clad 12a and an upper clad 12b. The clad 12 is formed on, for example, a silicon substrate or a glass substrate.

The clad 12 is made of a silica-based glass material. Each of the first port waveguide 11a, the multi-mode interference waveguide 11b, and the second port waveguides 11ca and 11cb is made of a silica-based glass material the refractive index of which is higher than the refractive index of the clad 12. As such a silica-based glass material the refractive index is high, silica glass that contains germania ($GeO_2$) or zirconia ($ZrO_2$) as a dopant for increasing the refractive index can be used for example. What is called an $SiO_2$—$ZrO_2$-based material, which is silica glass that contains zirconia, is particularly preferable because the material can make the relative refractive index higher.

The sizes of respective sections of the first port waveguide 11a and the second port waveguides 11ca and 11cb are set, in accordance with the relative refractive-index differences thereof with respect to the clad 12, so that light of a wavelength in use (for example, the 1.55 μm band) can be propagated in the single mode. The sizes of a section of the multi-mode interference waveguide 11b is set, in accordance with the relative refractive-index difference thereof with respect to the clad 12, so that light of a wavelength in use (for example, the 1.55 μm band) can be propagated in the multi-mode and so that either one of the polarized-wave separating function and the polarized-wave combining function that are described below can be obtained.

The multi-mode interference waveguide 11b has two slits 11ba and 11bb formed therein. The slits 11ba and 11bb is made of the same material as that of the upper clad 12b and is buried.

The slits 11ba and 11bb are formed in shapes that enable the multi-mode interference waveguide 11b to impart different effective refractive indexes to respective mutually orthogonal polarized light waves input from the first port waveguide 11a, thereby separating the mutually orthogonal polarized light waves input from the first port waveguide 11a, and that enables the separated mutually orthogonal polarized light waves to be output from the respective second port waveguides 11ca and 11cb. That is, when light L1 that contains respective components in mutually orthogonal polarization modes that are the TM mode and the TE mode is input to the first port waveguide 11a, the light polarizing element 10 outputs light L2 in the TE mode from the second port waveguide 11ca and outputs light L3 in the TM mode from the second port waveguide 11cb, for example, as illustrated in FIG. 1A. Thus, the light polarizing element 10 functions as a polarized-wave separating element. The light polarizing element 10 also functions as a polarized-wave combining element because of the reciprocity of light. That is, when light of two linearly polarized waves (in the TE mode and the TM mode) orthogonal to each other is input to the second port waveguides 11ca and 11cb, the light polarizing element 10 performs polarized-wave combination on light of these waves and outputs resultant light from the first port waveguide 11a.

In order to implement such polarized-wave separating and polarized-wave combining functions, the slits 11ba and 11bb extend substantially linearly in a direction from the first port waveguide 11a toward the second port waveguides 11ca and 11cb and are substantially parallel to each other. Here, the direction from the first port waveguide 11a toward the second port waveguides 11ca and 11cb is a direction in which the light L1 input to the first port waveguide 11a travels in the light polarizing element 10. This direction is substantially the same as the lengthwise direction of (propagation direction of light in) the multi-mode interference waveguide 11b.

Sizes of the light polarizing element 10 are exemplified as follows. For example, a length La thereof is 1900 μm, and a pitch Pa between the second port waveguides 11ca and 11cb, is 10 μm. Each of the slits 11ba and 11bb has a width of 0.6 μm. Each of the first port waveguide 11a and the second port waveguides 11ca and 11cb has a size of 3 μm×3 μm. The relative refractive-index difference of each of the waveguides with respect to the clad 12 is 5.5%. The other sizes are preferably designed in accordance with these exemplified values so that a desired polarization extinction ratio (PER) can be obtained.

The light polarizing element 10 does not have a slit formed that transverses a waveguide as in the light polarizing element 100 in the related art and can thus suppress a radiation loss, thereby resulting in a smaller excess loss. While the light polarizing element 100 in the related art has a size of, for example, about 3 mm×2 mm in a top view, the light polarizing element 10 has a size of, for example, about 2 mm×0.015 mm in a top view and thus can be smaller in size. The light polarizing element 10 can be formed without the work of inserting and fixing a quarter wavelength plate, and therefore can be formed without difficulty but with ease, and with a high production yield. Furthermore, the light polarizing element 10 is low-cost by not using a relatively expensive quarter wavelength plate and has higher reliability by also not using an adhesive agent for fixing a quarter wavelength plate.

Simulation calculation was performed on the light polarizing element 10 designed as a polarized-wave separating element with sizes set as those exemplified above. The calculation resulted in an excess loss not more than 0.1 dB and a PER not less than 30 dB at a wavelength of 1550 nm.

The light polarizing element 10 can be formed, for example, by the following method. First, a cladding layer made of a silica-based glass is deposited as a film on a silicon substrate up to a certain thickness using, for example, a plasma chemical vapor deposition (CVD) process, whereby a part corresponding to the lower clad 12a is formed. Subsequently, a layer to form the waveguides (waveguide forming layers) is deposited as a film using a sputtering process. Subsequently, the cladding layer and the waveguide forming layer are annealed by being heated, thereby being transformed into transparent glass.

Subsequently, the waveguide forming layer is patterned, using a photolithographic technique and an etching process, into the shapes of the first port waveguide 11a, the multi-mode interference waveguide 11b, and the second port waveguides 11ca and 11cb, so that the shapes of the waveguides are formed. At the same time, the slits 11ba and 11bb are formed. That is, no additional process for forming the slits 11ba and 11bb is needed. The etching process is implemented through dry etching, in which, for example, a fluorine based gas (for example, carbon tetrafluoride (CF4)) that is used in processing silica-based glass is used.

Subsequently, the upper clad 12b is formed so as to cover the lower clad 12a and all of the waveguides. The upper clad 12b can be formed by thermally melting, into transparent glass, fine particles made of silica-based glass after depositing the fine particles using, for example, a known flame hydrolysis deposition (FHD) process.

When the slit has a width of 0.3 μm or more, the slit is formed more easily using a photolithographic technique and an etching process than otherwise. The slit therefore preferably has such a width.

Second Embodiment

Figure 2A:
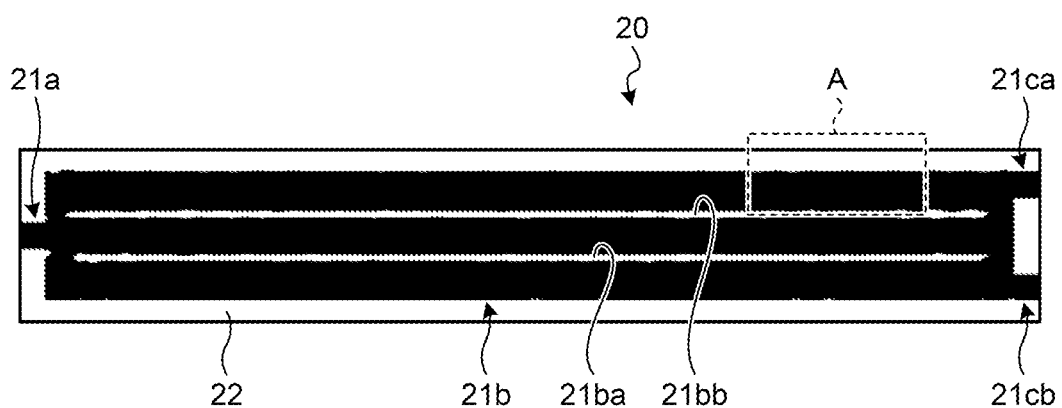
FIG. 2A is a schematic view of a light polarizing element according to a second embodiment.
Figure 2B:
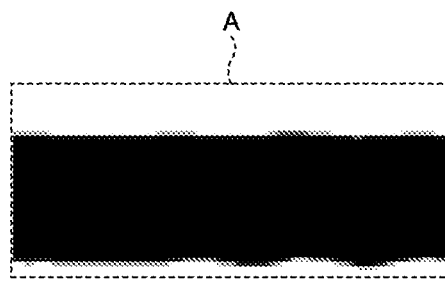
FIG. 2B is a schematic view of a light polarizing element according to the second embodiment.

FIGS. 2A and 2B are schematic views of a light polarizing element according to a second embodiment. FIG. 2A is a top view, and FIG. 2B is an enlarged view of a region A in FIG. 2A.

A light polarizing element 20 includes a first port waveguide 21a, a multi-mode interference waveguide 21b, two second port waveguides 21ca and 21cb, and a clad 22. The multi-mode interference waveguide 21b has slits 21ba and 21bb formed therein. The first port waveguide 21a, the multi-mode interference waveguide 21b, and the second port waveguides 21ca and 21cb have structurally optimized shapes by performing structure optimization on first port waveguide 11a, the multi-mode interference waveguide 11b, and the second port waveguides 11ca and 11cb in the light polarizing element 10 according to the first embodiment. The clad 22 is identical to the clad 12 in the light polarizing element 10.

The structurally optimized shape means a shape specified through computer simulation, as a shape that can result in a small excess loss, in a repetitive process that the shapes of the respective outer circumferential surfaces of the waveguides and the shapes of the respective inner circumferential surfaces of the slits are subjected to small perturbation and a coupling loss corresponding to the shapes obtained by the perturbation is calculated through the computer simulation. This optimization algorithm can be implemented using, for example, an approach that goes by the name of the wavefront matching method or the topology optimization method. The topology optimization method is used in the present second embodiment.

The light polarizing element 20 functions as a polarized-wave separating element or a polarized-wave combining element in the same manner as the light polarizing element 10. In the same manner as the light polarizing element 10, the light polarizing element 20 can result in a smaller excess loss, a reduced size, ease of manufacturing, a high yield, a reduced cost, and higher reliability. In particular, the excess loss can be smaller in the light polarizing element 20 than in the light polarizing element 10.

Figure 3:
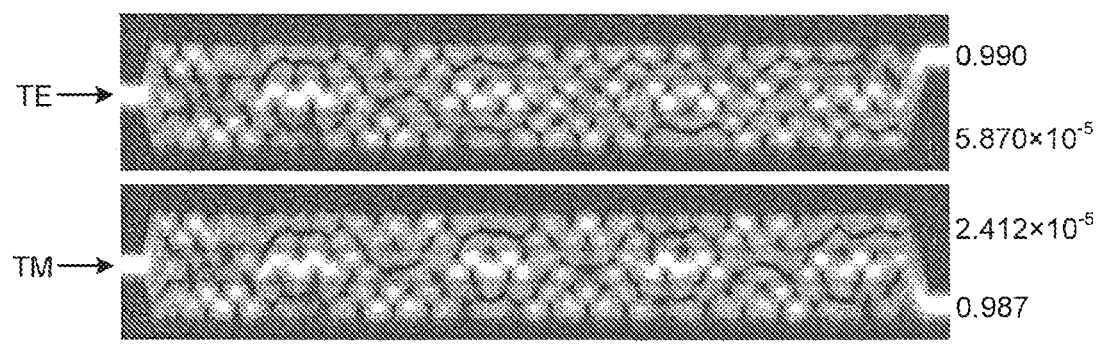
FIG. 3 illustrates a simulation result of an optical characteristic of the light polarizing element illustrated in FIG. 2A.

Simulation calculation was performed on the light polarizing element 20 designed as a polarized-wave separating element with sizes and relative refractive-index differences set to those exemplified in the first embodiment. The calculation resulted in an excess loss not more than 0.05 dB and a PER not less than 40 dB at a wavelength of 1550 nm. FIG. 3 illustrates a simulation result of an optical characteristic of the light polarizing element 20. FIG. 3 indicates that, when light in the TE mode is input at a relative intensity of 1 from the first port waveguide, the light is output at an intensity of 0.990 from the upper second port waveguide and is hardly output from the lower second port waveguide and that, when light in the TM mode is input at a relative intensity of 1 from the first port waveguide, the light is output at an intensity of 0.987 from the lower second port waveguide and is hardly output from the upper second port waveguide.

Furthermore, as an example, the light polarizing element 20 was formed with sizes and relative refractive-index differences set in the first embodiment in a forming method exemplified in the first embodiment. The formed light polarizing element was used as a polarized-wave separating element, and the excess loss and the PER thereof were measured in a band that spans 40 nm between wavelengths of 1530 nm and 1570 nm.

Figure 4:
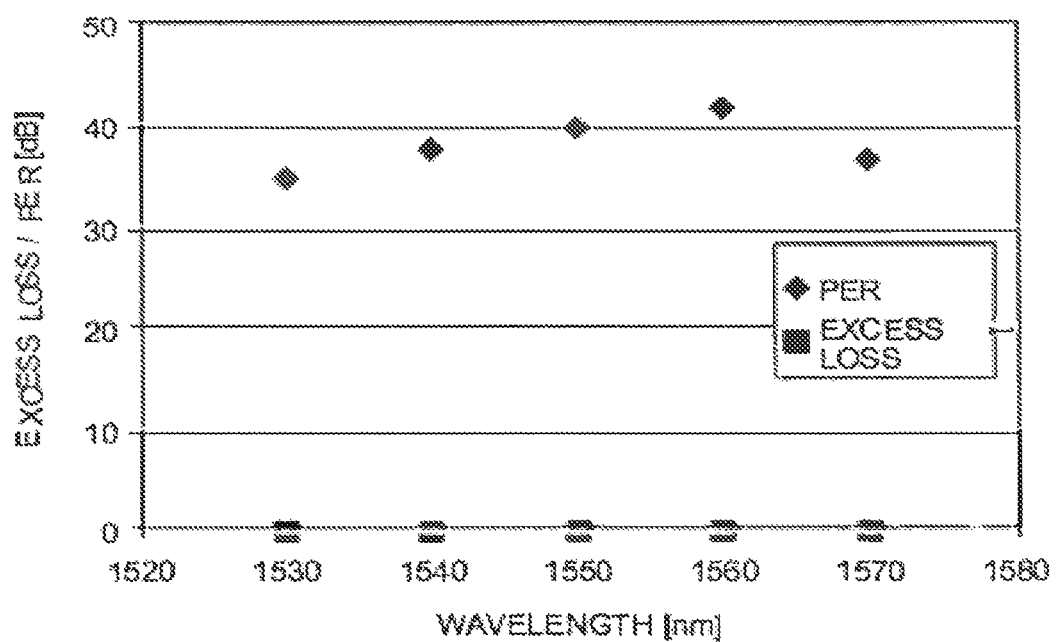
FIG. 4 illustrates a measurement result of an optical characteristic of a light polarizing element according to an example.

FIG. 4 illustrates a measurement result of an optical characteristic of a light polarizing element of an example. As illustrated in FIG. 4, over a wide band that spans 40 nm, the excess loss was not more than 0.2 dB, and the PER is 35 dB, indicating the polarized-wave separation characteristic thereof is favorable.

Third Embodiment

Figure 5:
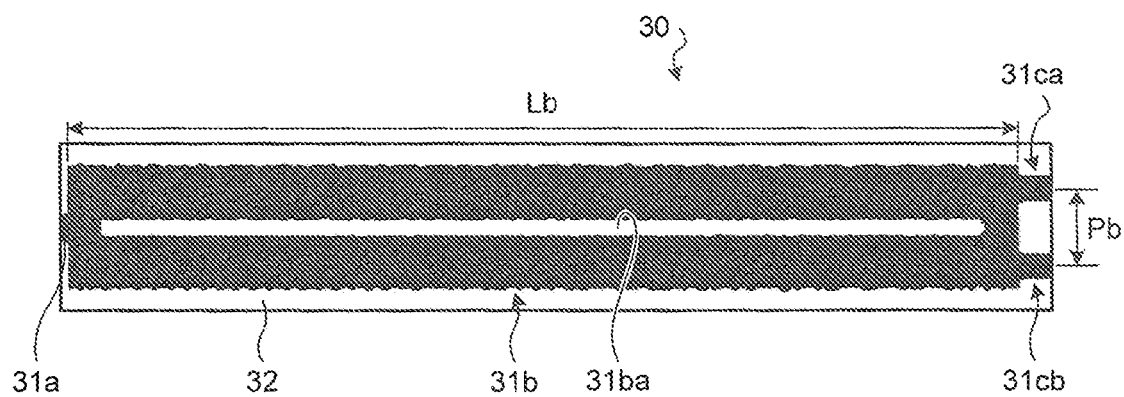
FIG. 5 is a schematic view of a light polarizing element according to a third embodiment.

FIG. 5 is a schematic view of a light polarizing element according to a third embodiment. A light polarizing element 30 includes a first port waveguide 31a, a multi-mode interference waveguide 31b, two second port waveguides 31ca and 31cb, and a clad 32.

The light polarizing element 30 substantially differs from the light polarizing elements 10 and 20 in the first and second embodiments in that the multi-mode interference waveguide 31b has only a single slit 31ba formed therein. Each of the waveguides and the clad 32 have the same configurations, materials, and functions as those of the light polarizing elements 10 and 20. The waveguides have structurally optimized shapes in the same manner as those of the light polarizing element 20.

Sizes of the light polarizing element 30 are exemplified as follows. For example, a length Lb thereof is 2500 μm, and a pitch Pb between the second port waveguides 31ca and 31cb, is 7.5 μm. The slit 31ba has a width of 1.2 μm. Each of the first port waveguide 31a and the second port waveguides 31ca and 31cb has a size of 3 μm×3 μm. The relative refractive-index difference of each of the waveguides with respect to the clad 32 is 5.5%. The other sizes are preferably designed in accordance with these exemplified values so that a desired PER can be obtained.

In the same manner as the light polarizing elements 10 and 20, the light polarizing element 30 functions as a polarized-wave separating element or a polarized-wave combining element, and can result in a smaller excess loss, a reduced size, ease of manufacturing, a high yield, a reduced cost, and higher reliability.

Figure 6:
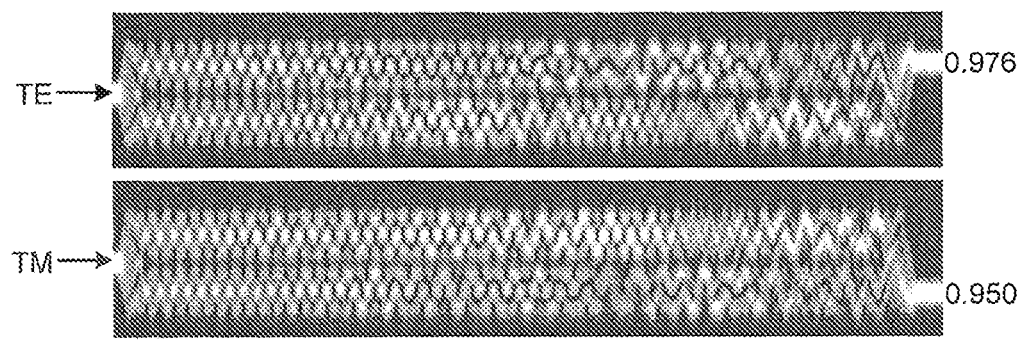
FIG. 6 illustrates a simulation result of an optical characteristic of the light polarizing element illustrated in FIG. 5.

Simulation calculation was performed on the light polarizing element 30 designed as a polarized-wave separating element with sizes and relative refractive-index differences set to those exemplified. The calculation resulted in an excess loss not more than 0.2 dB and a PER not less than 39 dB at a wavelength of 1550 nm. FIG. 6 illustrates a simulation result of an optical characteristic of the light polarizing element 30. FIG. 6 indicates that, when light in the TE mode is input at a relative intensity of 1 from the first port waveguide, the light is output at an intensity of 0.976 from the upper second port waveguide and is hardly output from the lower second port waveguide and that, when light in the TM mode is input at a relative intensity of 1 from the first port waveguide, the light is output at an intensity of 0.950 from the lower second port waveguide and is hardly output from the upper second port waveguide.

Fourth Embodiment

Figure 7:
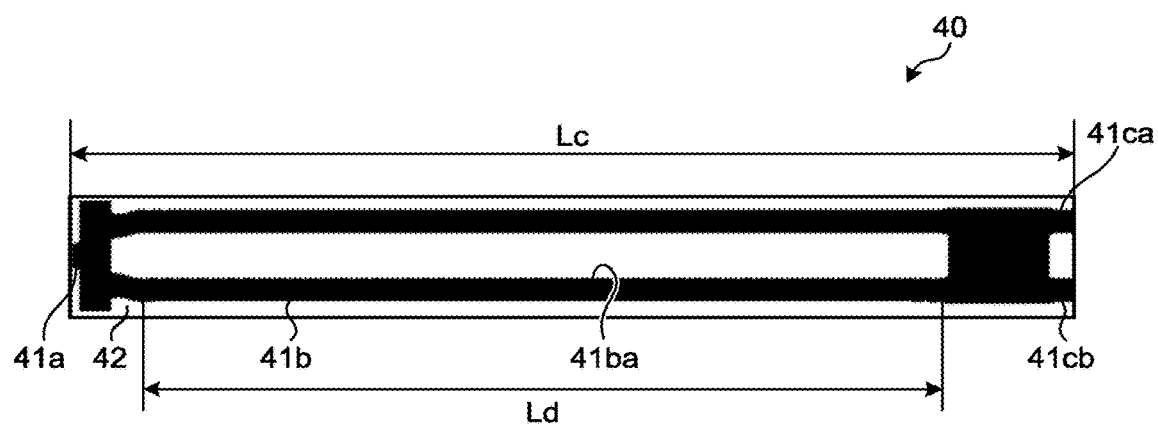
FIG. 7 is a schematic view of a light polarizing element according to a fourth embodiment.

FIG. 7 is a schematic view of a light polarizing element according to a fourth embodiment. A light polarizing element 40 includes a first port waveguide 41a, a multi-mode interference waveguide 41b, two second port waveguides 41ca and 41cb, and a clad 42.

The multi-mode interference waveguide 41b has only a single slit 41ba formed therein in the light polarizing element 40 as in the light polarizing element 30 according to the third embodiment, but with a wider slit width. Specifically, the slit width of the slit 41ba gradually widens from the first port waveguide 41a toward the second port waveguides 41ca and 41cb, becomes constant, and then gradually narrows toward the second port waveguides 41ca and 41cb. Each of the waveguides and the clad 42 have the same configurations, materials, and functions as those of the light polarizing elements 10, 20, and 30. The waveguides have structurally optimized shapes in the same manner as those of the light polarizing element 20 and 30.

The size of the light polarizing element 40 is exemplified as follows. For example, a length Lc thereof is 2500 μm, and a length Ld of a part having a constant width of the slit 41ba is 2000 μm. The slit 41ba has a width of 5 μm. The relative refractive-index difference of each of the waveguides with respect to the clad 42 is 5.5%. The other sizes are preferably designed in accordance with these exemplified values so that a desired PER can be obtained.

In the same manner as the light polarizing elements 10, 20, and 30, the light polarizing element 40 functions as a polarized-wave combining element and can result in a smaller excess loss, a reduced size, ease of manufacturing, a high yield, a reduced cost, and higher reliability.

Figure 8:
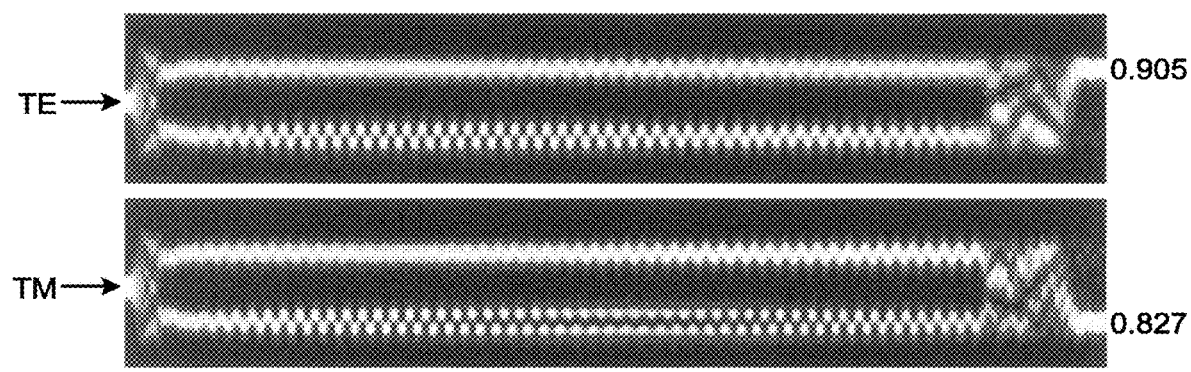
FIG. 8 illustrates a simulation result of an optical characteristic of the light polarizing element illustrated in FIG. 7.

Simulation calculation was performed on the light polarizing element 40 designed as a polarized-wave separating element with sizes and relative refractive-index differences set as those exemplified. The calculation resulted in an excess loss of about 0.78 dB and a PER of about 19.5 dB at a wavelength of 1550 nm. FIG. 8 illustrates a simulation result of an optical characteristic of the light polarizing element 40. FIG. 8 indicates that, when light in the TE mode is input at a relative intensity of 1 from the first port waveguide, the light is output at an intensity of 0.905 from the upper second port waveguide and is hardly output from the lower second port waveguide and that, when light in the TM mode is input at a relative intensity of 1 from the first port waveguide, the light is output at an intensity of 0.827 from the lower second port waveguide and is hardly output from the upper second port waveguide.

While the relative refractive-index difference of each of the waveguides with respect to the clad is 5.5% in the above embodiments and examples, the relative refractive-index difference is not limited to 5.5%. When the relative refractive-index difference is not less than 0.7%, more advantageous effects than those of a configuration in the related art can be obtained. Thus, it is preferable that the relative refractive-index difference be not less than 0.7%.

While the number of slits is one or two in the above embodiments and examples, the number of slits may be three or more. As the number of slits increases, a manufacturing error that may occur with respect to the designed shape of any of the slits would have a lower impact on optical characteristics of the light polarizing element, that is, tolerance against manufacturing errors is higher. It is preferable that the width of each slit be not less than 0.3 μm and not more than 5.0 μm. When the width of the slit is not more than 5.0 μm, the light polarizing element can be prevented from having a large size.

While each slit is linear and extends in a direction from the first port waveguide toward the two second port waveguides in the above embodiments and examples, the shape of the slit is not limited thereto. That is, the effects of the present disclosure can be exhibited when each slit has a shape that enables the multi-mode interference waveguide to impart different effective refractive indexes to respective mutually orthogonal polarized light waves input from the first port waveguide, thereby separating the mutually orthogonal polarized light waves, and that enables the separated mutually orthogonal polarized light waves to be output from the respective two second port waveguides.

While the light polarizing element is made of a silica-based glass material in the above embodiments and examples, a material used for the light polarizing element is not particularly limited other than being an optical material. The present disclosure is applicable to, for example, the light polarizing element that is made of a semiconductor material.

According to the present disclosure, the effect of providing a light polarizing element that suppresses a radiation loss, enables a reduced size, and can be formed with ease is obtained.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A light polarizing element comprising:
a first port waveguide;
two second port waveguides; and
a multi-mode interference waveguide optically connected to the first port waveguide and the two second port waveguides, the multi-mode interference waveguide having at least one slit formed therein, the at least one slit having a shape that enables the multi-mode interference wave guide to give different effective refractive indexes to respective mutually orthogonal polarized light waves input from the first port waveguide, thereby separating the mutually orthogonal polarized light waves, and that enables the separated mutually orthogonal polarized light waves to be output from the respective two second port waveguides, wherein in a cross-sectional plane orthogonal to a longitudinal direction of the light polarizing element, a plurality of waveguides of the multi-mode interference waveguide are separated from each other by the at least one slit and the at least one slit has a depth equal to a depth of a core material of each of the plurality of waveguides of the multi-mode interference wave guide, and the at least one slit is filled with cladding, in the longitudinal direction of the light polarizing element, a length of the at least one slit is shorter than a length of the multi-mode interference waveguide, the light polarizing element is configured to have a polarization extinction ratio (PER) of 35 dB or more in a wavelength range of 1530 nm to 1570 nm, and in the multi-mode interference waveguide, the optical characteristics in the TE mode and TM mode indicates the intensity distribution in which thirty or more peaks are present in the direction orthogonal to the propagation direction in the TE mode and the TM mode, respectively.

2. The light polarizing element according to claim 1, wherein the at least one slit extends in a direction from the first port waveguide toward the two second port waveguides.

3. The light polarizing element according to claim 1, wherein a plurality of the slits are formed as the at least one slit.

4. The light polarizing element according to claim 1, wherein each of the slits is substantially a straight line.

5. The light polarizing element according to claim 1, wherein a width of each of the slits is greater than or equal to 0.3 μm and less than or equal to 5.0 μm.

6. The light polarizing element according to claim 1, further comprising a clad surrounding outer circumferences of individual waveguides that are the first port waveguide, the second port waveguide, and the multi-mode interference waveguides, wherein
a relative refractive-index difference between the clad and each of the individual waveguides is 0.7% or greater.

7. The light polarizing element according to claim 1, wherein the first port waveguide, the second port waveguides, and the multi-mode interference waveguides are made of a silica-based glass material containing zirconia.

8. A light polarizing element comprising:
a first port waveguide;
two second port waveguides; and
a rectangular multi-mode interference waveguide optically connected to the first port waveguide and the two second port waveguides, wherein
the multi-mode interference waveguide has at least one slit formed therein, the at least one slit extending in a direction substantially parallel to a direction extending from the first port waveguide toward the two second port waveguides, wherein in a cross-sectional plane orthogonal to a longitudinal direction of the light polarizing element, a plurality of waveguides of the multi-mode interference waveguide are separated from each other by the at least one slit and the at least one slit has a depth equal to a depth of a core material of each of the plurality of waveguides of the multi-mode interference wave guide, and the at least one slit is filled with cladding, in the longitudinal direction of the light polarizing element, a length of the at least one slit is shorter than a length of the multi-mode interference waveguide, and the light polarizing element is configured to have a polarization extinction ratio (PER) of 35 dB or more in a wavelength range of 1530 nm to 1570 nm, and in the multi-mode interference waveguide, the optical characteristics in the TE mode and TM mode indicates the intensity distribution in which thirty or more peaks are present in the direction orthogonal to the propagation direction in the TE mode and the TM mode, respectively.

9. A method of forming a light polarizing element, comprising:

forming shapes of a waveguide that includes a first port waveguide, two second port waveguides, and a multi-mode interference waveguide optically connected to the first port waveguide and the two second port waveguides; and forming at least one slit in the multi-mode interference waveguide in a cross-sectional plane orthogonal to a longitudinal direction of the light polarizing element, a plurality of waveguides of the multi-mode interference waveguide being separated from each other by the at least one slit and the at least one slit has a depth equal to a depth of a core material of each of the plurality of waveguides of the multi-mode interference wave guide, and the at least one slit is filled with cladding, in the longitudinal direction of the light polarizing element, a length of the at least one slit being shorter than a length of the multi-mode interference waveguide, wherein, the at least one slit having a shape that enables the multi-mode interference wave guide to give different effective refractive indexes to respective mutually orthogonal polarized light waves input from the first port waveguide, thereby separating the mutually orthogonal polarized light waves, and that enables the separated mutually orthogonal polarized light waves to be output from the respective two second port waveguides, and the light polarizing element is configured to have a polarization extinction ratio (PER) of 35 dB or more in a wavelength range of 1530 nm to 1570 nm, and in the multi-mode interference waveguide, the optical characteristics in the TE mode and TM mode indicates the intensity distribution in which thirty or more peaks are present in the direction orthogonal to the propagation direction in the TE mode and the TM mode, respectively.

10. The light polarizing element according to claim 1, wherein:

when light in a TE mode is input at a relative intensity of 1 to the first port waveguide, the light in a TE mode is output at an intensity of 0.976 from one of the two second port waveguides and is hardly output from another of the two second port waveguides such that the PER of 35 dB or more is provided, and when light in a TM mode is input at a relative intensity of 1 to the first port waveguide, the light in a TM mode is output at an intensity of 0.950 from the another second port waveguide and is hardly output from the one of the second port waveguides such that the PER of 35 dB or more is provided.

\* \* \* \* \*